United States Patent
Calhoun et al.

(10) Patent No.: US 11,106,508 B2
(45) Date of Patent: Aug. 31, 2021

(54) ELASTIC MULTI-TENANT CONTAINER ARCHITECTURE

(71) Applicant: Espressive, Inc., Santa Clara, CA (US)

(72) Inventors: Patrice Ronald Calhoun, Sunnyvale, CA (US); Francisco Fernandez, Castro Valley, CA (US); Jamie Lyn Keane, Mountain View, CA (US); Daniel Valdivia Milanes, Mountain View, CA (US); Ryan D. Moore, San Jose, CA (US); Rohit Kumar Suri, Fremont, CA (US)

(73) Assignee: Espressive, Inc., Santa Clara, CA (US)

( * ) Notice: Subject to any disclaimer, the term of this patent is extended or adjusted under 35 U.S.C. 154(b) by 448 days.

(21) Appl. No.: 15/669,409

(22) Filed: Aug. 4, 2017

(65) Prior Publication Data

US 2019/0042322 A1    Feb. 7, 2019

(51) Int. Cl.
*G06F 9/50* (2006.01)
*H04L 12/24* (2006.01)
*H04L 29/08* (2006.01)
*G06F 21/62* (2013.01)

(52) U.S. Cl.
CPC ............ *G06F 9/5077* (2013.01); *G06F 9/505* (2013.01); *G06F 9/5072* (2013.01); *G06F 9/5083* (2013.01); *H04L 41/0896* (2013.01); *H04L 67/10* (2013.01); *G06F 21/6218* (2013.01); *G06F 2209/508* (2013.01); *H04L 67/1008* (2013.01)

(58) Field of Classification Search
None
See application file for complete search history.

(56) References Cited

U.S. PATENT DOCUMENTS

| | | | |
|---|---|---|---|
| 9,471,353 B1 | 10/2016 | Christopher et al. | |
| 9,703,611 B1* | 7/2017 | Christopher | ........ G06F 11/0712 |
| 2013/0145006 A1* | 6/2013 | Tammam | .............. G06F 9/5027 709/223 |
| 2013/0326506 A1* | 12/2013 | McGrath | ............. G06F 9/45558 718/1 |
| 2016/0321588 A1* | 11/2016 | Das | .................. G06Q 10/06315 |
| 2017/0171245 A1 | 6/2017 | Lee et al. | |
| 2017/0373940 A1* | 12/2017 | Shahab | ................... H04L 47/70 |

* cited by examiner

*Primary Examiner* — Mohamed Ibrahim
(74) *Attorney, Agent, or Firm* — Almanac IP Advisors LLP (57) ABSTRACT

Containers are allocated to tenants in a multi-tenant container system in a SaaS environment. Resource usage by containers is monitored to determine one or more per-tenant resource metrics, where each container provides an isolated execution space dedicated to a corresponding tenant. Data storage may also be isolated for each tenant. Each tenant is allocated resources associated with one or more containers. Containers are automatically allocated to tenants based at least in part upon the one or more per-tenant resource metrics.

35 Claims, 4 Drawing Sheets

ELASTIC MULTI-TENANT CONTAINER ARCHITECTURE

BACKGROUND

Field of the Disclosure

This disclosure relates to the field of networked (e.g., cloud) computing, and more particularly to allocating resources to tenants in a multi-tenant network environment.

Description of Related Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Cloud computing is a model of service delivery for enabling on-demand network access to a shared pool of configurable computing resources (e.g., networks, bandwidth, servers, processing, memory, applications, and services) that can be rapidly provisioned and released with minimal management effort or interaction with a provider of the service.

Software multi-tenancy refers to a software architecture in which an application is hosted on one or more servers (e.g., in a cloud) and serves multiple tenants. A tenant, typically an organization such as a business entity, represents a group of users who share common access with specific privileges to the application instance. In a multi-tenant architecture, a software application is designed to provide every tenant a dedicated share of the application instance including its accompanying resources, such as processing capability and data storage capacity. A common infrastructure provides services to the multiple tenants in a secure way so that each tenant's processing activities and data are isolated from that of all other tenants.

Over time, changes may occur in resource demands by a tenant or in available resource capacity. For example, server processing resources may experience an upsurge in transaction requests from the employee-users of an accounting firm tenant during tax season, requiring an increase in the allocation of resources to the tenant. After tax season, the accompanying decline in requests from that tenant would warrant deallocation of unnecessary resources. As another example, a server or data center may experience an outage requiring re-allocation of resources to the tenants hosted by the server or data center.

Conventional architectures that serve multiple tenants or users adopt different approaches for reallocation of resources in response to changes in resource demand and supply (capacity). One approach assigns an instance of a Java app for every tenant on a server. The workload for each tenant is fixed to particular Java virtual machine ("VM") on a server. This assignment is static, the routing of tenant requests is static, the resource assignments are static, and changing them requires manual intervention.

The VMs reside above a hypervisor layer. Each virtual machine runs its own operating system ("OS"). For each VM in a multi-tenant environment, a container engine resides above the VM OS to support multiple containers. In this approach, isolation is at the VM level. The mapping of tenants to VMs is 1:1, and the mapping of VMs to servers is N:1. During routing, traffic for a particular tenant travels through a particular server in a data center. If, for example, the data center fails, then traffic must be rerouted to a backup server in a different data center. Conventionally, this requires a manual change to redirect all requests to the backup server. In another case, if more processing or memory is required, the conventional approach requires a manual process to upgrade resources.

Another conventional approach, the shared multi-tenant approach, employs the same application code for different tenants. An example may be a shared web hosting service, where a single server is provisioned for N users, and the server codebase is the same for all users. Thus, an upgrade to the code for one tenant affects all tenants. Isolation is at the tenant level. The mapping of tenants to servers is N:1. These location assignments are static, request routing is static, the resource assignments are static, and changing them requires manual intervention. Service growth requires manual intervention to move to a larger instance. If a resource fails, then the requests for all tenants must be manually redirected to a substitute resource.

In a third conventional approach, the architecture provides different services, e.g., photos, video, messaging, to many users. The load is unpredictable so the architecture must be "elastic," i.e., ready to add resources such as servers on demand, and make changes to routing or load balancing rules. However, this approach is not multi-tenant. Any user is mapped to any server for a request to a particular service based on load balancing or routing logic, e.g., user X uploading photos may access photo server 942 today, and server 4 tomorrow. User Y may access photo server 22 today, server 22 tomorrow, and server 2743 the next day. There is no mapping of user to server. Isolation happens at the software/user level. Services may grow dynamically, but all instances are homogeneous within a service. If a service fails, users will manually retry their request to resolve the issue.

SUMMARY OF THE DISCLOSURE

Embodiments of the disclosure overcome the disadvantages of conventional multi-tenant architectures by providing systems, methods, and computer readable media for allocating containers to tenants in a multi-tenant container system in a software as a service ("SaaS") environment. Embodiments of the disclosure monitor resource usage of multiple containers to determine one or more per-tenant resource metrics, where each container provides an isolated execution space dedicated to a corresponding tenant. Data storage may also be isolated for each tenant. Each tenant is allocated resources associated with one or more containers. Embodiments automatically allocate containers to tenants based at least in part upon the one or more per-tenant resource metrics.

Automatic allocation of containers may be based at least in part upon a prediction of per-tenant resource usage that is itself based at least in part upon the per-tenant resource metrics. Monitoring of resource usage may be performed across servers in one or more data centers. Embodiments may update routing rules for directing tenant transaction requests to containers, and update load balancing rules for load balancing tenant transaction requests across containers.

The per-tenant resource metrics include resource availability metrics or resource demand metrics. The resource availability metrics include resource failure, response time to tenant transaction requests, processor usage, or memory usage. The resource demand metrics include rate of transaction requests by tenant or geographic origin of tenant transaction requests.

Unlike conventional architectures, in the stateless, elastic, multi-tenant container architecture of embodiments of the disclosure, reprovisioning of resources to multiple tenants does not require manual re-routing of transaction requests to new containers. Changes to code versions of a shared application do not change the code for all tenants, but can be isolated on a per-tenant basis. Each tenant/platform customer is assigned to one or more containers on one or more servers. The location assignment and tenant transaction request routing are dynamic. The resource assignment is automatic and dynamic. Changing them involves no manual intervention. Isolation happens at the container level. For each service, the tenant:container mapping is 1:N, and the container:server mapping is N:1, depending on allotment. Service growth is dynamic based on metrics, and requires no manual intervention. Service failure is considered a resource availability metric and requires no manual intervention to resolve.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

Figure 1:
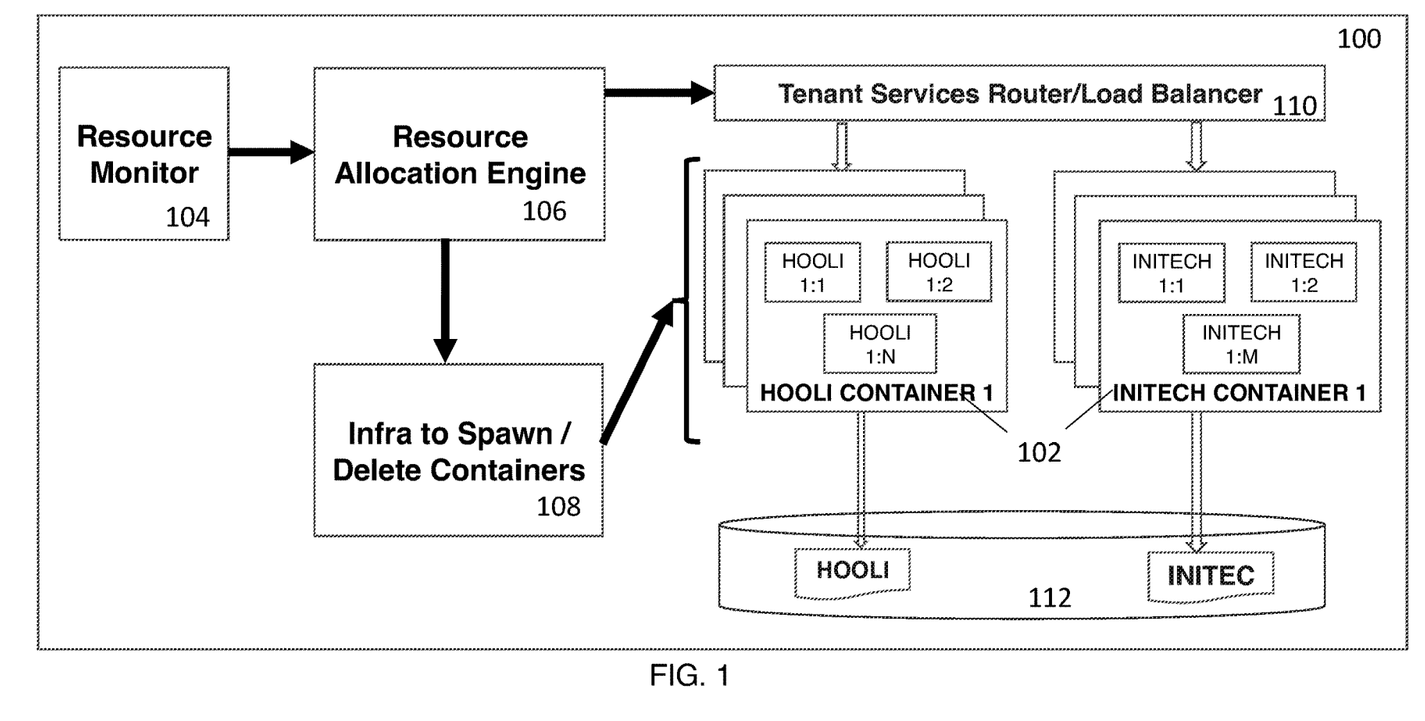
FIG. 1 illustrates a dynamic, elastic multi-tenant container architecture, according to embodiments of the disclosure.

FIG. 1 illustrates a dynamic, elastic multi-tenant container architecture 100, according to embodiments of the disclosure. The architecture includes multiple containers 102. Each container is dedicated to a single tenant. One or more containers (and its resources) may be allocated to a tenant. (As used herein, "allocation" may be used interchangeably with "provisioning.") One or more containers may run on a networked (e.g., cloud) server, a data center server, or an on-premises server, which may support different tenant container environments. Containers for the same tenant may run on the same or different servers. In this example, the containers 102 are shown residing in the same data center 104.

A "container" is a convenient way to package a network application, such as a cloud application, with all of its dependencies, into a standardized unit for software development. The container insulates the application from the underlying platform. However, when a tenant changes from one container environment to another, the cloud resources assigned to the tenant may be changed as well.

Networked computing resources are typically housed in server farms that run network applications, either using a hardware architecture, so-called bare metal cloud hosting, or using a virtualized architecture wherein applications run inside virtual servers, such as virtual machines, that are mapped onto physical servers in a data center facility.

Figure 2:
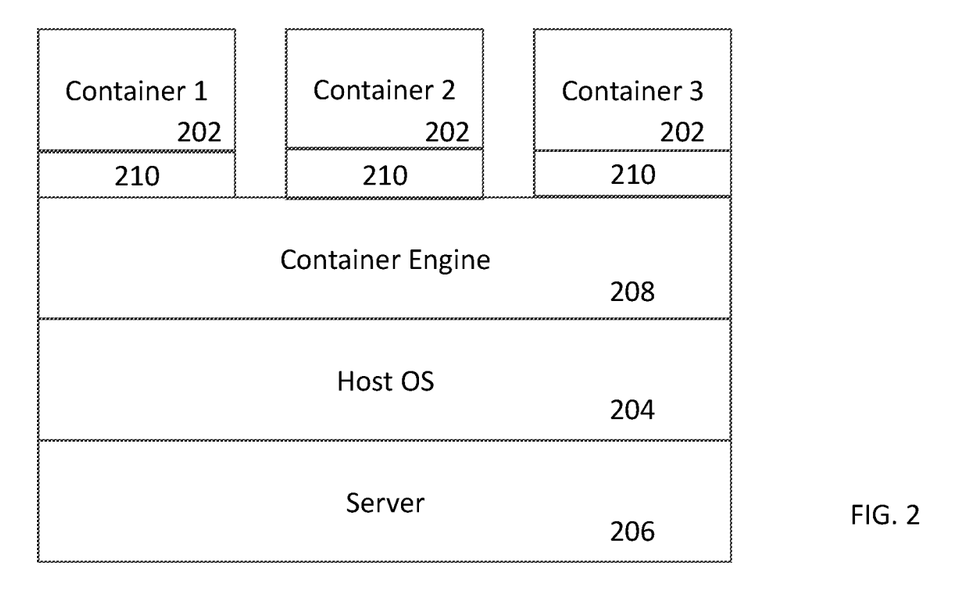
FIG. 2 illustrates a container architecture stack, according to embodiments of the disclosure.

Referring to FIG. 2, in embodiments of the disclosure the containers 202 run on a level above an operating system kernel ("Host OS") 204, such as a Linux kernel, hosted on a server 206. In embodiments, a container engine layer 208 at each server 206 enables processes within different containers to be isolated from each other. For example, the container engine 208 may allocate isolated processing and storage resources to each container. Moreover, each container 202 is associated with its own binaries and libraries 210 that contain executables, content, and metadata that are isolated from the binaries and libraries of the other containers. Thus, the processes execute concurrently on the same server using the same OS kernel in their own execution spaces. This process isolation enables the system to run different versions of application code for each container. The associated persistent data for each container may also be isolated, by organizing the data for each container in a private table, according to embodiments of the disclosure.

The container nomenclature used for the architecture of embodiments of the disclosure may be as follows: [Tenant ID]: [Container ID]: [Node ID], where Tenant ID identifies the tenant to which the container is allocated, Container ID identifies the container, and Node ID identifies a compute node (e.g., thread or process) running in the container.

As shown in this example, container 1 102 is allocated to tenant Hooli and compute nodes Hooli 1:1, Hooli 1:2, and Hooli 1:N for tenant Hooli. In the figure, behind that container 102 are other containers 102 allocated to other nodes for tenant Hooli. Similarly, container 2 102 is allocated to tenant Initech and nodes Initech 1:1, Initech 1:2, and Initech 1:M for tenant Initech. Behind that container 102 are other containers 102 allocated to other nodes for tenant Initech. The containers shown in the figure may reside on the same server, on different servers within the same data center, or on different servers within different data centers.

The architecture 100 also includes a resource monitor 104, a resource allocation engine 106, infrastructure to spawn or delete containers 108, a tenant services router and load balancer 110, and persistent data storage 112. In embodiments, the infrastructure 108 includes the container engine 208 (for each server). The infrastructure 108 determines the assignment of containers to servers. The infrastructure 108 uses the container engine 208 (at the server level) to instantiate and provision new containers and delete existing containers using techniques known in the art.

Figure 3:
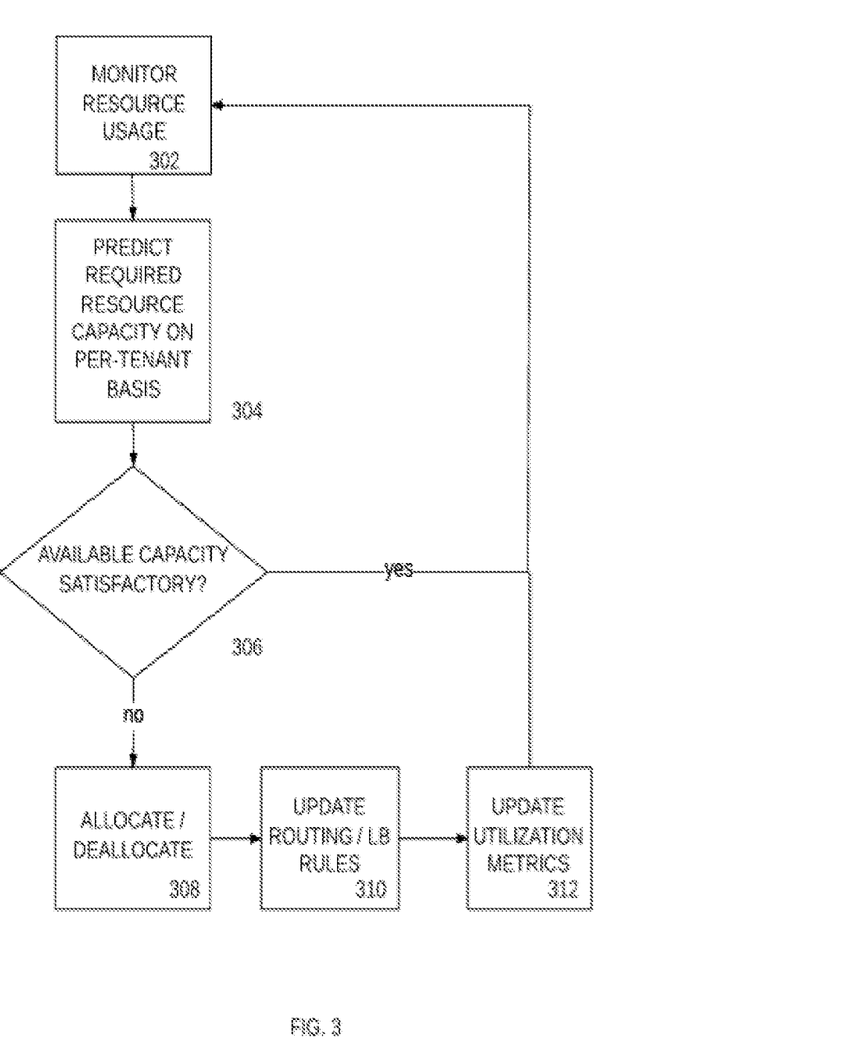
FIG. 3 illustrates a flow diagram describing per-tenant container allocation, according to embodiments of the disclosure.
Figure 4:
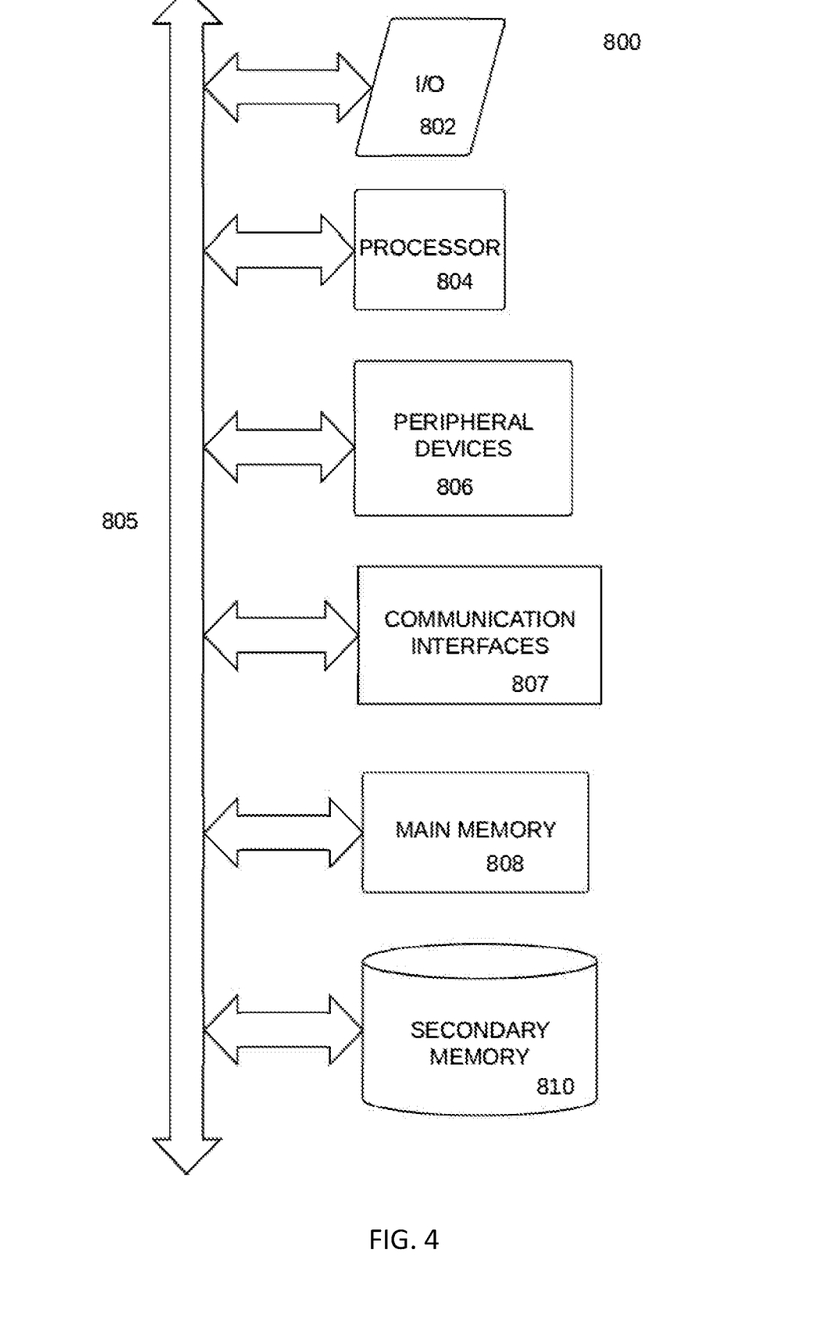
FIG. 4 illustrates an example of a computer system that may be used to execute instructions stored in a non-transitory computer readable medium (e.g., memory) in accordance with embodiments of the disclosure.

With reference to the architecture diagram of FIG. 1 and the flow diagram of FIG. 3, the resource monitor 104 monitors resource usage of the containers 102 by each tenant across all servers and all data centers (302). The metrics monitored for the relevant resources include, for example, computing and memory capacity, request response times, latency, failure of a resource such as a server or a data center, storage capacity, and number of transaction requests made by each tenant per unit time.

The resource allocation engine 106 predicts the capacity of those resources required by the tenant based, at least in part, on the monitored resource usage (304). The determination may be made using machine learning or other predictive techniques known in the art.

The resource allocation engine 106 determines whether the available capacity of the resources for the tenant, according to the current container-resource allocation to the tenant, would satisfy the predicted capacity (306). For example, the resource allocation engine 106 may determine whether the predicted resource usage for any resource exceeds or falls below the available capacity by respective thresholds.

If the available capacity is satisfactory, then resource monitoring would continue (302).

If the available capacity is not sufficiently large enough, the resource allocation engine 106 may cause the provisioning of one or more containers with adequate resources for the tenant as needed (on demand) so that sufficient capacity will be available to handle the predicted resource usage (308). Thus, the resource allocation engine 106 dynamically and elastically allocates resources on a per-tenant basis as needed, independent of the other tenants.

For example, the resource allocation engine 106 may predict that the response time for a tenant's request for a service that is directed to a first container 102 on a first server exceeds a threshold time set by a service level agreement. The resource allocation engine 106 may thus instruct the infrastructure provider to cause infrastructure 108 to provision more processing power to the tenant on demand by, for example, provisioning a new server that has enough available processing capacity to host a new container 102 for the tenant with the required resources, and to spawn and provision the new container 102 in that server with the required resources. (According to embodiments, the system predictively maintains a sufficient pool of available, unassigned server resources.) In another example, the resource allocation engine 106 may instruct the infrastructure provider to cause infrastructure 108 to spawn and provision an adequately-resourced container 102 on the same server hosting the first container 102 if that server has enough resource availability.

In embodiments, the allocation of containers to resources may also be based upon other factors, such as geographic proximity of resources (e.g., servers) to tenant traffic demand.

In allocating a new container to a tenant, the resource allocation engine 106 may cause the deprovisioning (deletion) of the first container and routing of all new tenant requests to the new container. Alternatively, the resource allocation engine 106 may maintain the first container and route all new tenant transaction requests to both the first and new containers to share the load. The new container may reside within the same data center or a different data center as the first container. The spawning (and deletion) of containers using the container engine 208 employs techniques known in the art.

Along with spawning a new container, the resource allocation engine 106 provides in real time, to the tenant services router/load balancer 110, new load balancing rules for determining to which containers 102 and nodes (including the new container and nodes therein) incoming transaction requests should be routed for the tenant (310).

Conversely, if the resource allocation engine 106 determines that predicted resource usage for a resource for a tenant falls below a minimum threshold, the resource allocation engine may deallocate resources accordingly.

The resource allocation engine 106 may also provide in real time, to the tenant services router/load balancer 110, new routing rules for routing, to the new container, some or all of the requests that the router would have previously directed to the first container (310). (If the old container has been deleted, the new routing rules would prevent routing to the deleted container.) The new routing rules specify the new container as an available routing destination, and specify how to route incoming requests to the first container or the new container according to the new load balancing rules. If resources supporting the first container (e.g., a server) fail, then the new rules may call for routing to the new container all requests that the router would have previously directed to the first container.

As part of routing, the resource allocation engine 106 may assign each single transaction request, such as a REST API call, to any available stateless compute node in the destination container. After the transaction request is fulfilled the node maintains no state. Changing the allocation of resources to a tenant changes the resource capacity available for other tenants. Accordingly, the resource allocation engine 106 may update the resource utilization metrics for all containers within the multi-tenant SaaS environment to reflect those changes (e.g., allocating a new container on a server would reduce the available processing capacity on that server)(312). Resource monitoring would continue (302).

The multi-tenant architecture enables rapid upgrades of application code on a per tenant basis. If a new version of code is available, the resource allocation engine may create a new container, load it with the new code version, and instruct the router/load balancer to reroute requests to the new container. The resource allocation engine may also deallocate/delete the container holding the old code version.

As seen above, the multi-tenant architecture of embodiments of the disclosure provides a separate execution space with dynamic routing and load balancing per tenant. The multi-tenant elastic architecture can scale independently for different tenants.

To enable dynamic reprovisioning, the multi-tenant architecture of embodiments of the disclosure may employ a stateless architecture, such as a RESTful architecture. When a process or thread executes a transaction it does not retain any state for the transaction. In a stateless system, no client context for a transaction is stored on the server between requests. Each request from any client contains all the information needed to service the request, and state is held in the client. The state can be transferred by the server to another service such as a database to maintain a persistent state for a period of time and to allow authentication. The client begins sending requests when it is ready to make the transition to a new state.

Some conventional systems require sessions for transactions. In those systems, when a server crashes, the connection drops and the application would need to be restarted. The stateless design of embodiments of the disclosure provides resiliency and avoids this problem—even if a data server experienced an outage, the system would dynamically reprovision resources and reroute transactions so that the user would not notice any disruption.

FIG. 3 illustrates an example of a computer system 800 that may be used to execute program code stored in a non-transitory computer readable medium (e.g., memory) in accordance with embodiments of the disclosure. The computer system includes an input/output subsystem 802, which may be used to interface with human users and/or other computer systems depending upon the application. The I/O subsystem 802 may include, e.g., a keyboard, mouse, graphical user interface, touchscreen, or other interfaces for input, and, e.g., an LED or other flat screen display, or other interfaces for output, including application program interfaces (APIs).

Program code may be stored in non-transitory computer-readable media such as persistent storage in secondary memory 810 or main memory 808 or both. Main memory 808 may include volatile memory such as random access memory (RAM) or non-volatile memory such as read only memory (ROM), as well as different levels of cache memory for faster access to instructions and data. Secondary memory may include persistent storage such as solid state drives, hard disk drives or optical disks. One or more processors 804 reads program code from one or more non-transitory media and executes the code to enable the computer system to accomplish the methods performed by the embodiments herein. Those skilled in the art will understand that the processor(s) may ingest source code, and interpret or compile the source code into machine code that is understandable at the hardware gate level of the processor(s) 804. The processor(s) 804 may include dedicated processors such as microcontrollers running firmware. The processor(s) 804 may include specialized processing units (e.g., GPUs) for handling computationally intensive tasks.

The processor(s) 804 may communicate with external networks via one or more communications interfaces 807, such as a network interface card, WiFi transceiver, etc. A bus 805 communicatively couples the I/O subsystem 802, the processor(s) 804, peripheral devices 806, communications interfaces 807, memory 808, and persistent storage 810. Embodiments of the disclosure are not limited to this representative architecture. Alternative embodiments may employ different arrangements and types of components, e.g., separate buses for input-output components and memory subsystems. Elements of embodiments of the disclosure, such as the resource allocation engine and the tenant service router/load balancer, may be implemented with at least some of the components (e.g., processor 804, memory 808, communication interfaces 807) of a computer system like that of computer system 800.

Those skilled in the art will understand that some or all of the elements of embodiments of the disclosure, and their accompanying operations, may be implemented wholly or partially by one or more computer systems including one or more processors and one or more memory systems like those of computer system 800. In particular, the elements of resource allocation engine, the tenant service router/load balancer, and any other automated systems or devices described herein may be computer-implemented. Some elements and functionality may be implemented locally and others may be implemented in a distributed fashion over a network through different servers, e.g., in client-server fashion, for example.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

What is claimed is:

1. A multi-tenant container system in a SaaS environment for serving a plurality of tenants, the system comprising:
   one or more processors;
   one or more non-transitory computer-readable media, coupled to the one or more processors and storing instructions that, when executed by one or more processors, cause the system to:
   monitor resource usage of a plurality of containers to determine one or more per-tenant resource metrics, wherein each container provides an isolated execution space dedicated to a corresponding tenant of the plurality of tenants, and each tenant is allocated resources associated with one or more containers, wherein a first container, of the plurality of containers, has been allocated to a first tenant of the plurality of tenants; and
   automatically allocate an additional, second container, of the plurality of containers, to the first tenant based at least in part upon the one or more per-tenant resource metrics, wherein the one or more per-tenant resource metrics comprise number of tenant transaction requests per unit time.

2. The system of claim 1, wherein the one or more per-tenant resource metrics comprise one or more resource availability metrics or one or more resource demand metrics.

3. The system of claim 2, wherein the one or more resource availability metrics comprise at least one of resource failure, response time to tenant transaction requests, processor usage, or memory usage.

4. The system of claim 2, wherein the one or more resource demand metrics comprise geographic origin of tenant transaction requests.

5. The system of claim 1, wherein automatic allocation of containers is based at least in part upon a prediction of per-tenant resource usage that is itself based at least in part upon the one or more per-tenant resource metrics.

6. The system of claim 1, wherein monitoring of resource usage is performed across a plurality of servers in one or more data centers.

7. The system of claim 1, wherein the one or more non-transitory computer-readable media further stores instructions that, when executed by one or more processors, cause the system to:
   update routing rules for directing tenant transaction requests to containers.

8. The system of claim 1, wherein the one or more non-transitory computer-readable media further stores instructions that, when executed by one or more processors, cause the system to:
   update load balancing rules for load balancing tenant transaction requests across containers.

9. The system of claim 1, wherein the data storage is isolated for each tenant.

10. The system of claim 1, wherein the one or more non-transitory computer-readable media further stores instructions that, when executed by one or more processors, cause the system to:
    automatically de-allocate one or more containers based at least in part upon the one or more per-tenant resource metrics.

11. The system of claim 1, wherein each container is allocated to at most one tenant.

12. A method for allocating containers to tenants in a multi-tenant container system in a SaaS environment for serving a plurality of tenants, the method comprising:
    monitoring resource usage of a plurality of containers to determine one or more per-tenant resource metrics, wherein each container provides an isolated execution space dedicated to a corresponding tenant of the plurality of tenants, and each tenant is allocated resources associated with one or more containers, wherein a first container, of the plurality of containers, has been allocated to a first tenant of the plurality of tenants; and
automatically allocating an additional, second container, of the plurality of containers, to the first tenant based at least in part upon the one or more per-tenant resource metrics, wherein the one or more per-tenant resource metrics comprise number of tenant transaction requests per unit time.

13. The method of claim 12, wherein the one or more per-tenant resource metrics comprise one or more resource availability metrics or one or more resource demand metrics.

14. The method of claim 13, wherein the one or more resource availability metrics comprise at least one of resource failure, response time to tenant transaction requests, processor usage, or memory usage.

15. The method of claim 13, wherein the one or more resource demand metrics comprise geographic origin of tenant transaction requests.

16. The method of claim 12, wherein automatic allocating containers is based at least in part upon a prediction of per-tenant resource usage that is itself based at least in part upon the one or more per-tenant resource metrics.

17. The method of claim 12, wherein monitoring resource usage is performed across a plurality of servers in one or more data centers.

18. The method of claim 12, further comprising updating routing rules for directing tenant transaction requests to containers.

19. The method of claim 12, further comprising updating load balancing rules for load balancing tenant transaction requests across containers.

20. The method of claim 12, wherein the data storage is isolated for each tenant.

21. The method of claim 12, further comprising automatically de-allocating one or more containers based at least in part upon the one or more per-tenant resource metrics.

22. The method of claim 12, wherein each container is allocated to at most one tenant.

23. One or more non-transitory computer-readable media for use in a multi-tenant container system in a SaaS environment for serving a plurality of tenants, the one or more non-transitory computer-readable media storing instructions that, when executed by one or more processors, cause the system to:
monitor resource usage of a plurality of containers to determine one or more per-tenant resource metrics, wherein each container provides an isolated execution space dedicated to a corresponding tenant of the plurality of tenants, and each tenant is allocated resources associated with one or more containers, wherein a first container, of the plurality of containers, has been allocated to a first tenant of the plurality of tenants; and
automatically allocate an additional, second container, of the plurality of containers, to the first tenant based at least in part upon the one or more per-tenant resource metrics, wherein the one or more per-tenant resource metrics comprise number of tenant transaction requests per unit time.

24. The one or more non-transitory computer-readable media of claim 23, wherein the one or more per-tenant resource metrics comprise one or more resource availability metrics or one or more resource demand metrics.

25. The one or more non-transitory computer-readable media of claim 24, wherein the one or more resource availability metrics comprise at least one of resource failure, response time to tenant transaction requests, processor usage, or memory usage.

26. The one or more non-transitory computer-readable media of claim 24, wherein the one or more resource demand metrics comprise geographic origin of tenant transaction requests.

27. The one or more non-transitory computer-readable media of claim 23, wherein automatic allocation of containers is based at least in part upon a prediction of per-tenant resource usage that is itself based at least in part upon the one or more per-tenant resource metrics.

28. The one or more non-transitory computer-readable media of claim 23, wherein monitoring of resource usage is performed across a plurality of servers in one or more data centers.

29. The one or more non-transitory computer-readable media of claim 23, wherein the one or more non-transitory computer-readable media further stores instructions that, when executed by one or more processors, cause the system to:
update routing rules for directing tenant transaction requests to containers.

30. The one or more non-transitory computer-readable media of claim 23, wherein the one or more non-transitory computer-readable media further stores instructions that, when executed by one or more processors, cause the system to:
update load balancing rules for load balancing tenant transaction requests across containers.

31. The one or more non-transitory computer-readable media of claim 23, wherein the data storage is isolated for each tenant.

32. The one or more non-transitory computer-readable media of claim 23, wherein the one or more non-transitory computer-readable media further stores instructions that, when executed by one or more processors, cause the system to:
automatically de-allocate one or more containers based at least in part upon the one or more per-tenant resource metrics.

33. The one or more non-transitory computer-readable media of claim 23, wherein each container is allocated to at most one tenant.

34. A multi-tenant container system in a SaaS environment for serving a plurality of tenants, the system comprising:
one or more processors;
one or more non-transitory computer-readable media, coupled to the one or more processors and storing instructions that, when executed by one or more processors, cause the system to:
monitor resource usage of a plurality of containers across a plurality of servers to determine one or more per-tenant resource metrics, wherein each container provides an isolated execution space and an isolated data storage space dedicated to a corresponding tenant of the plurality of tenants, and each tenant is allocated resources associated with one or more containers, wherein a first container, of the plurality of containers, has been allocated to a first tenant of the plurality of tenants;
predict per-tenant resource usage based at least in part upon the one or more per-tenant resource metrics, wherein the one or more per-tenant resource metrics comprise number of tenant transaction requests per unit time;
automatically allocate or de-allocate a second container, of the plurality of containers, respectively to or from the first tenant based at least in part upon predicted per-tenant resource usage; and update routing rules for directing tenant transaction requests to containers based at least in part upon the allocation of containers to tenants.

35. The system of claim 34, wherein each container is allocated to at most one tenant.

* * * * *